US011829879B2

(12) United States Patent
Zhang et al.

(10) Patent No.: US 11,829,879 B2
(45) Date of Patent: *Nov. 28, 2023

(54) DETECTING ADVERSARIAL ATTACKS THROUGH DECOY TRAINING

(71) Applicant: International Business Machines Corporation, Armonk, NY (US)

(72) Inventors: Jialong Zhang, White Plains, NY (US); Frederico Araujo, White Plains, NY (US); Teryl Taylor, Danbury, CT (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,212

(22) Filed: Sep. 23, 2022

(65) Prior Publication Data

US 2023/0019198 A1 Jan. 19, 2023

Related U.S. Application Data

(63) Continuation of application No. 16/021,354, filed on Jun. 28, 2018, now Pat. No. 11,501,156.

(51) Int. Cl.
*G06N 3/08* (2023.01)
*H04L 9/40* (2022.01)
(Continued)

(52) U.S. Cl.
CPC ............... *G06N 3/08* (2013.01); *G06F 17/10* (2013.01); *G06N 3/045* (2023.01);
(Continued)

(58) Field of Classification Search
CPC .......... G06N 3/08; G06N 3/0454; G06N 3/04; G06F 17/10; G06F 21/56; G06F 21/566;
(Continued)

(56) References Cited

U.S. PATENT DOCUMENTS 8,549,643 B1 * 10/2013 Shou ..................... G06F 21/556
455/410
9,407,646 B2 8/2016 Cruz Mota et al.
(Continued)

FOREIGN PATENT DOCUMENTS

CN 107273747 A 10/2017
CN 107368752 A 11/2017
WO 2017155292 A1 9/2017

OTHER PUBLICATIONS

Eykholt et al., "Robust Physical-World Attacks on Deep Learning Models", arXiv:1707.08945v5 [cs.CR] Apr. 10, 2018.
(Continued)

*Primary Examiner* — Michael A Keller
(74) *Attorney, Agent, or Firm* — Harrington & Smith (57) ABSTRACT

Decoy data is generated from regular data. A deep neural network, which has been trained with the regular data, is trained with the decoy data. The trained deep neural network, responsive to a client request comprising input data, is operated on the input data. Post-processing is performed using at least an output of the operated trained deep neural network to determine whether the input data is regular data or decoy data. One or more actions are performed based on a result of the performed post-processing.

19 Claims, 8 Drawing Sheets

(51) Int. Cl.
  *G06F 17/10* (2006.01)
  *G06N 3/045* (2023.01)
(52) U.S. Cl.
  CPC ...... *H04L 63/1416* (2013.01); *H04L 63/1466* (2013.01); *G06T 2207/20081* (2013.01)
(58) Field of Classification Search
  CPC ............. H04L 63/1416; H04L 63/1466; G06T 2207/20081; G06K 9/6256
  See application file for complete search history.

(56) References Cited

U.S. PATENT DOCUMENTS

| | | | |
|---|---|---|---|
| 9,450,972 | B2 | 9/2016 | Cruz Mota et al. |
| 9,674,207 | B2 | 6/2017 | Di Pietro et al. |
| 11,151,447 | B1 | 10/2021 | Chen |
| 2010/0077483 | A1 | 3/2010 | Stolfo et al. |
| 2012/0084866 | A1 | 4/2012 | Stolfo et al. |
| 2017/0024641 | A1 | 1/2017 | Wierzynski |
| 2019/0050749 | A1 | 2/2019 | Sanketi |
| 2019/0102675 | A1* | 4/2019 | Biswas ................. G06N 3/045 |
| 2020/0019699 | A1 | 1/2020 | Araujo |

OTHER PUBLICATIONS

Goodfellow et al., "Explaining And Harnessing Adversarial Examples", arXiv:1412.6572 (Mar. 20, 2015).
Miyato et al., "Virtual Adversarial Training: a Regularization Method for Supervised and Semi-supervised Learning", arXiv:1704.03976 (Apr. 13, 2017).
Meng et al., "MagNet: a Two-Pronged Defense against Adversarial Example", CCS '17, Oct. 30-Nov. 3, 2017, Dallas, TX, USA.
Xu et al., "Feature Squeezing: Detecting Adversarial Examples in Deep Neural Networks", arXiv:1704.01155v2 [cs.CV] Dec. 5, 2017.
Papernot et al., "Distillation as a Defense to Adversarial Perturbations against Deep Neural Networks", arXiv:1511.04508v2 [cs.CR] Mar. 14, 2016.
Zantedeschi et al., "Efficient Defenses Against Adversarial Attacks", Proceedings of the 10th ACM Workshop on Artificial Intelligence and Security, pp. 39-49 (Nov. 3, 2017).
Carlini et al., "Adversarial Examples Are Not Easily Detected: Bypassing Ten Detection Methods", arXiv:1705.07263v2 [cs.LG] Nov. 1, 2017.
Carlini et al., "MagNet and 'Efficient Defenses Against Adversarial Attacks' are Not Robust to Adversarial Examples", arXiv: 1711.08478v1 [cs.LG] Nov. 22, 2017.
Athalye et al., "Obfuscated Gradients Give a False Sense of Security: Circumventing Defenses to Adversarial Examples", arXiv: 1802.00420v2 [cs.LG] Feb. 15, 2018.
Merkow, M. S., and Breithaupt, J. Information Security: Principles and Practices. Pearson Education, Jun. 2014, chapter 2.
Anderson, R., "Why information security is hard—an economic perspective", in Proceedings of the 17th Annual Computer Security Applications Conference (ACSAC) (2001), pp. 358-365. [retrieved Jun. 27, 2018].
13. Juels, A., "A bodyguard of lies: the use of honey objects in information security", in Proceedings of the 19th ACM Symposium on Access Control Models and Technologies, ACM, SACMAT'14, Jun. 25-27, 2014, London, Ontario, Canada. pp. 1-4.
Miller, B. et al. "Adversarial Active Learning" AISec'14, Nov. 7, 2014, Scottsdale, Arizona, USA.
Gornitz, N. et al. "Toward Supervised Anomaly Detection" Journal of Artificial Intelligence Research 46 (2013) [published Feb. 2013].
Sudha, I. et al. "Alleviating Internal Data Theft Attacks by Decoy Technology in Cloud" International Journal of Computer Science and Mobile Computing, vol. 3. Issue 3, Mar. 2014 pp. 217-222.
Somaraju A. et al. "Protection Against Adversarial Attacks on Machine Learning and Artificial Intelligence" An IP.com Prior Art Database Technical Disclosure published Jan. 29, 2018.
List of IBM Patent Applications Treated As Related, Sep. 2022, 2 pages.

* cited by examiner

DETECTING ADVERSARIAL ATTACKS THROUGH DECOY TRAINING

BACKGROUND

This invention relates generally to computer security and, more specifically, relates to detecting adversarial attacks through decoy training.

Abbreviations that may be found in the specification and/or the drawing figures are defined below, at the beginning of the detailed description section.

Deep neural networks (DNNs) have achieved remarkable performance on many tasks, including visual recognition. However, recent research has shown that DNNs are vulnerable to adversarial attacks. In these attacks, and attacker intentionally injects small perturbations (also known as adversarial examples) to a DNN's input data to cause misclassifications. Such attacks are dangerous if the targeted DNN is used in critical applications, such as autonomous driving, robotics, or visual authentications and identification. For instance, a real physical adversarial attack on autonomous DNN models has been shown, which caused the target DNN models to misclassify "stop sign" as "speed limit". See Eykholt et al., "Robust Physical-World Attacks on Deep Learning Models", arXiv:1707.08945v5 [cs.CR] 10 Apr. 2018.

SUMMARY

This section is meant to be exemplary and not meant to be limiting.

In an exemplary embodiment, a method is disclosed. The method comprises generating decoy data from regular data and training a deep neural network, which has been trained with the regular data, with the decoy data. The method also includes, responsive to a client request comprising input data, operating the trained deep neural network on the input data, and performing post-processing using at least an output of the operated trained deep neural network to determine whether the input data is regular data or decoy data. The method includes performing one or more actions based on a result of the performed post-processing.

An exemplary apparatus includes one or more processors and one or more memories including computer program code. The one or more memories and the computer program code are configured to, with the one or more processors, cause the apparatus to perform at least the following: generating decoy data from regular data; training a deep neural network, which has been trained with the regular data, with the decoy data; responsive to a client request comprising input data, operating the trained deep neural network on the input data; performing post-processing using at least an output of the operated trained deep neural network to determine whether the input data is regular data or decoy data; and performing one or more actions based on a result of the performed post-processing.

In another exemplary embodiment, a computer program product is disclosed. The computer program product comprises a computer readable storage medium having program instructions embodied therewith, the program instructions executable by a device to cause the device to perform operations comprising: generating decoy data from regular data; training a deep neural network, which has been trained with the regular data, with the decoy data; responsive to a client request comprising input data, operating the trained deep neural network on the input data; performing post-processing using at least an output of the operated trained deep neural network to determine whether the input data is regular data or decoy data; and performing one or more actions based on a result of the performed post-processing.

Another exemplary embodiment is an apparatus, comprising: means for generating decoy data from regular data; means for training a deep neural network, which has been trained with the regular data, with the decoy data; means, responsive to a client request comprising input data, for operating the trained deep neural network on the input data; means for performing post-processing using at least an output of the operated trained deep neural network to determine whether the input data is regular data or decoy data; and means for performing one or more actions based on a result of the performed post-processing.

DETAILED DESCRIPTION

The following abbreviations that may be found in the specification and/or the drawing figures are defined as follows:

AI artificial intelligence
API application programming interface
DNN deep neural network, e.g., an artificial neural network (ANN) with multiple hidden layers between the input and output
FGSM fast gradient step method
I/F interface
N/W network
ML machine learning The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

INTRODUCTION

Figure 1:
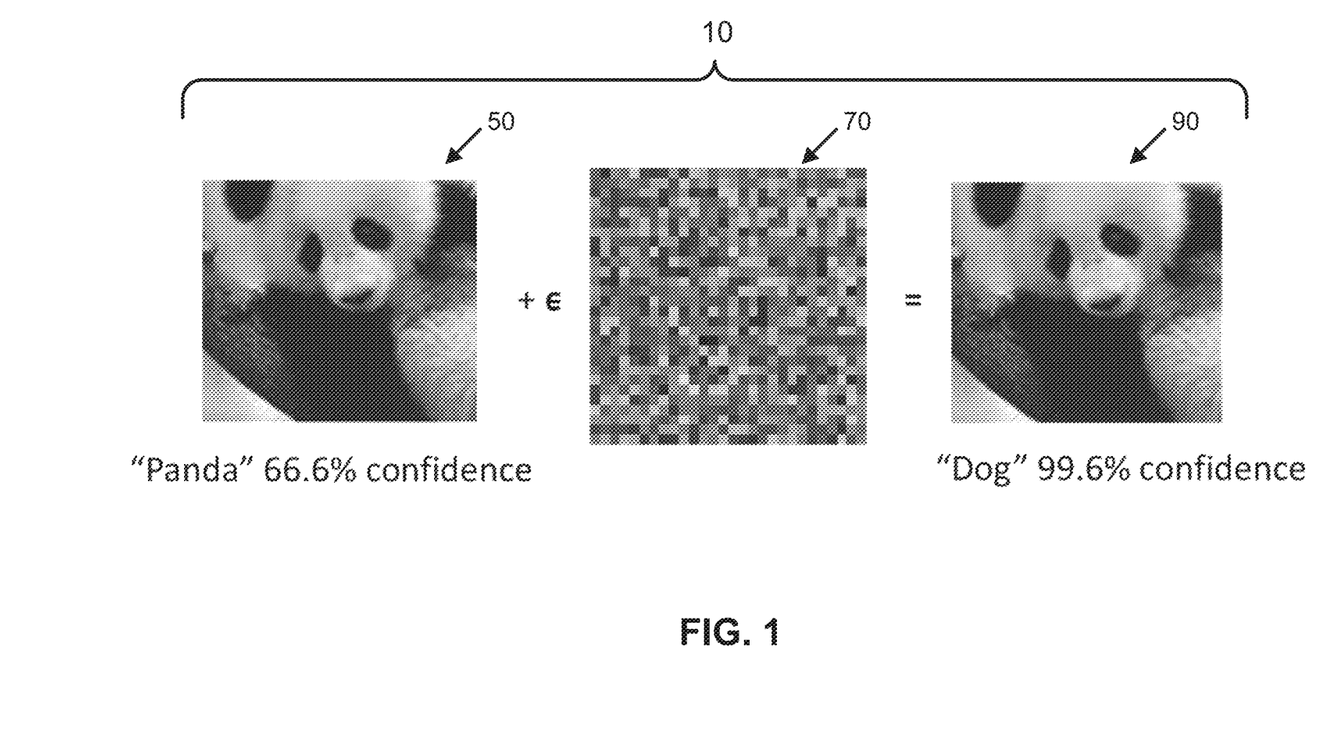
FIG. 1 illustrates an example of an adversarial attack on an original DNN using an image to create a misclassification by the original DNN.

An introduction to this general area is now presented. As explained above, recent research has shown that DNNs are vulnerable to adversarial attacks. Adversarial attacks intentionally inject small perturbations (also known as adversarial examples) to a DNN's input data to cause misclassifications. FIG. 1 is an example of an adversarial attack 10 on an original DNN using an image to create a misclassification by the original DNN.

FIG. 1 shows an original image 50 of a panda. The original image 50 has a 66 percent (%) probability of a DNN's selecting the class "panda" for the image. An adversarial attack 10 injects perturbations ε, illustrated by image 70, into a data stream with the original image 50 to create the final image 90. The final image 90, which has been perturbed by the adversarial attack 10, causes the DNN to select the class "dog" with a 99.6% confidence. Thus, the adversarial attack caused a high probability of error in image detection for this example.

Several forms of defense to these adversarial attacks have been proposed. These include adversarial training to reduce error rate in classification, see Goodfellow et al., "Explaining And Harnessing Adversarial Examples", arXiv: 1412.6572 (2014); and Miyato et al., "Virtual Adversarial Training: a Regularization Method for Supervised and Semi-supervised Learning", arXiv:1704.03976 (2017). Another form of defense is input preprocessing, see Meng et al., "MagNet: a Two-Pronged Defense against Adversarial Example", CCS '17, Oct. 30-Nov. 3, 2017, Dallas, TX, USA; and Xu et al., "Feature Squeezing: Detecting Adversarial Examples in Deep Neural Networks", arXiv: 1704.01155v2 [cs.CV] 5 Dec. 2017. A further form of defense is different model hardening, see Papernot et al., "Distillation as a Defense to Adversarial Perturbations against Deep Neural Networks", arXiv:1511.04508v2 [cs.CR] 14 Mar. 2016; and Zantedeschi et al., "Efficient Defenses Against Adversarial Attacks", Proceedings of the 10th ACM Workshop on Artificial Intelligence and Security, pages 39-49 (2017).

Although these defenses make it harder for attackers to generate adversarial examples, prior works have shown that those defenses are still vulnerable and they can still generate successful adversarial attacks. See the following: Carlini et al., "Adversarial Examples Are Not Easily Detected: Bypassing Ten Detection Methods", arXiv:1705.07263v2 [cs.LG] 1 Nov. 2017; Carlini et al., "MagNet and 'Efficient Defenses Against Adversarial Attacks' are Not Robust to Adversarial Examples", arXiv:1711.08478v1 [cs.LG] 22 Nov. 2017; and Athalye et al., "Obfuscated Gradients Give a False Sense of Security: Circumventing Defenses to Adversarial Examples", arXiv:1802.00420v2 [cs.LG] 15 Feb. 2018

"Security through obscurity" has become a byword for security practices that rely upon an adversary's ignorance of the system design rather than any fundamental principle of security. Security through obscurity is the belief that a system of any sort can be secure so long as nobody outside of its implementation group is allowed to find out anything about its internal mechanisms. That is, security through obscurity is a security practice which relies on the secrecy of the design or implementation as the main method of providing security for a system. An example of "security through obscurity" is described in Anderson, R., "Why information security is hard—an economic perspective", in Proceedings of the 17th Annual Computer Security Applications Conference (ACSAC) (2001), pp. 358-365. History has demonstrated that such practices offer very weak security at best, and are dangerously misleading at worst, potentially offering an illusion of security that may encourage poor decision-making. For the latter, see Merkow, M. S. and Breithaupt, J., Information Security: Principles and Practices. Pearson Education, 2014, chapter 2, specifically page 25. Specifically, in DNN contexts, it has been demonstrated that obfuscated gradients, a type of gradient masking, are ineffective to protect against an adaptive attacker, leading to a false sense of security in defenses against adversarial examples. See Athalye et al., "Obfuscated Gradients Give a False Sense of Security: Circumventing Defenses to Adversarial Examples", arXiv:1802.00420v2 [cs.LG] 15 Feb. 2018.

Security defenses based on deception potentially run the risk of falling into the "security through obscurity" trap. If the defense's deceptiveness hinges on attacker ignorance of the system design—details that defenders should conservatively assume will eventually become known by any suitably persistent threat actor—then any security offered by the defense might be illusory and therefore untrustworthy. Consequently, it is important to carefully examine the underlying basis upon which decoy training can be viewed as a security-enhancing technology.

Like all deception strategies, the effectiveness of decoy training relies upon withholding certain secrets from adversaries (e.g., which decoy representations are used in the training process). But secret-keeping does not in itself disqualify decoy training as obscurity-reliant. For example, modern cryptography is frequently championed as a hallmark of anti-obscurity defense despite its foundational assumption that adversaries lack knowledge of private keys, because disclosing the complete implementation details of crypto algorithms does not aid attackers in breaking cyphertexts derived from undisclosed keys. Juels (see Juels, A., "A bodyguard of lies: the use of honey objects in information security", in Proceedings of the 19th ACM Symposium on Access Control Models and Technologies, 2014, ACM, pp. 1-4) defines indistinguishability and secrecy as two properties required for successful deployment of honey systems. These properties are formalized as follows.

Consider a simple system in which $S=\{s_1, \ldots, s_n\}$ denotes a set of n objects of which one, $s^*=s_j$, for $j \in \{1, \ldots, n\}$ is the true object, while the other n−1 are honey objects. The two properties then are as follows.

1) Indistinguishability: To deceive an attacker, honey objects must be hard to distinguish from real objects. They should, in other words, be drawn from a probability distribution over possible objects similar to that of real objects.

2) Secrecy: In a system with honey objects, j is a secret. Honey objects can, of course, only deceive an attacker that does not know j, so j cannot reside alongside S. Kerckhoffs' principle therefore comes into play: the security of the system must reside in the secret, i.e., the distinction between honey objects and real ones, not in the mere fact of using honey objects.

Overview of Exemplary Embodiments

An overview of some of the exemplary embodiments is now presented. In contrast to existing works that try to harden DNNs to make it impractical to generate adversarial examples, an exemplary embodiment herein introduces decoy training as a novel methodology for misdirecting and detecting adversarial attacks. Decoy training may be thought of to "soften" DNNs to facilitate the generation of adversarial samples that are similar to pre-defined decoys used to train the DNN. Specifically, in an exemplary embodiment, we generate multiple decoys for each class so that those decoys will become different local minima for gradient descent. As is known, gradient descent is a first-order iterative optimization algorithm for finding a minimum of a function. As a result, when attackers attempt to generate adversarial examples based on gradient descent, they are misdirected towards data similar to the training decoy set. This is true because decoy training will make decoys become overfitted in the model. Therefore, it implicitly creates locally optimum paths for gradient decent.

There are several benefits of using decoy training in adversarial contexts:

1) Decoy training is stealthy and transparent to attackers since attackers can still generate adversarial examples, although the generated examples are similar to the training decoys.

2) An approach using decoy training is robust to white-box attacks, where attackers have access to the entire DNN model.

3) Decoy training has low false positives since any input data that are similar to decoys are true adversarial attacks.

4) An approach using decoy training can detect both known and unknown adversarial attacks since such an approach does not depend on any known adversarial examples.

Decoy training as a methodology satisfies indistinguishability and secrecy by design. Indistinguishability derives from the inability of an attacker to determine whether an apparently successful attack is the result of exploiting a DNN model using a derived decoy. Secrecy implies that the decoy training set should be secret. However, full attacker knowledge of the design and implementation details of the machine learning model and algorithms does not disclose which decoys have been selected in the training process. Adapting Kerckhoffs' principle for deception, decoy training is not detectable even if everything about the system, except the training set, is public knowledge.

This argues that decoy training as a paradigm does not derive its security value from obscurity. Rather, its deceptions are based on well-defined secrets. Maintaining this confidentiality distinction between the publicness of the DNN design and implementation details, versus the secrecy of the training set is important for crafting robust, effective deceptions to protect against adversarial attacks.

Exemplary System Overview

Figure 2A:
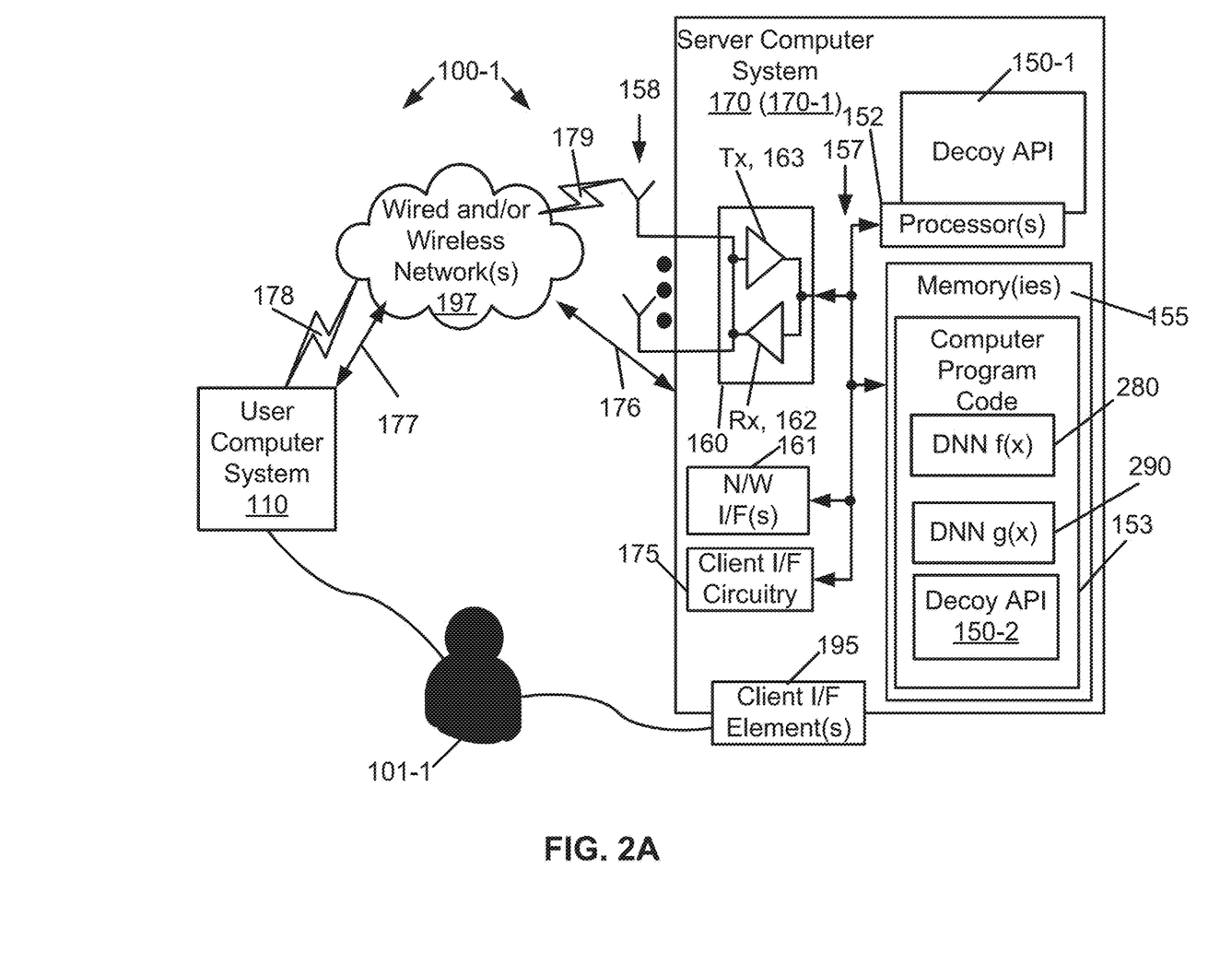
FIG. 2A shows a block diagram of one possible and non-limiting exemplary system in which the exemplary embodiments may be practiced.

More detail regarding these techniques is presented after a system into which the exemplary embodiments may be used is described. In FIG. 2A, a client computer system 110 is in wired and/or wireless communication with a server computer system 170 in a communications network 100-1. The client computer system 110 communicates with server computer system 170 via one or more wired or wireless networks 197 and wired links 176, 177 or wireless links 178, 179. The client 101 may communicate directly with the server computer system 170 via the one or more client interface elements 195 or may communicate with the server via the one or more wired or wireless networks 197. The client 101 is illustrated in this example as a human being 101-1. However, the client 101 can be anything that tries to use or uses the AI service(s) provided by the server computer system 170 and, e.g., its decoy API 150. Other examples of clients 101 are illustrated in more detail in reference to FIGS. 2 and 3.

The server computer system 170 includes one or more processors 152, one or more memories 155, one or more network interfaces (N/W I/F(s)) 161, one or more transceivers 160, and client interface circuitry 175, interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153 comprising a first neural network, DNN f(x), 280, a second neural network, DNN g(x), 290, and a decoy API 150-2. Although the DNNs 280 and 290 are shown separately from the decoy API 150, they may also be part of the decoy API 150. The server computer system 170 includes a decoy API 150, comprising one of or both parts 150-1 and/or 150-2, which may be implemented in a number of ways. The decoy API 150 may be implemented in hardware as decoy API 150-1, such as being implemented as part of the one or more processors 152. The decoy API 150-1 may be implemented also as an integrated circuit or through other hardware such as a programmable gate array. In another example, the decoy API 150 may be implemented as decoy API 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. It should also be noted that the devices shown in the server computer system 170 are not limiting and other, different, or fewer devices may be used.

The one or more buses 157 may be address, data, and/or control buses, and may include any interconnection mechanism, such as a series of lines on a motherboard or integrated circuit, fiber optics or other optical communication equipment, wireless channels, and the like. The client interface circuitry 175 communicates with one or more client interface elements 195, which may be formed integral with the server computer system 170 or be outside the server computer system 170 but coupled to the server computer system 170. The client interface elements 195 include one or more of the following: one or more camera(s); on or more radar sensors; one or more audio device(s) (such as microphone(s), speaker(s), and the like; one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used.

In brief, the server computer system 170 performs training (e.g., under control of the decoy API 150) of both the DNN f(x) 280 and the DNN g(x) 290 with regular and decoy data. The output of the DNN f(x) 280 may be a confidence score for each class, while the output for the DNN g(x) 290 may be a confidence score for either "regular data" or "decoy data". The decoy API 150 causes the server computer system 170 to use both outputs to determine a final output. If the final output indicates "decoy data", the server computer system 170 can perform one or more predetermined protective actions. This is described in more detail below.

It is noted that the computer system 170 is indicated as a "server". While there may be a client-server relationship between the client computer system 110 and the server computer system 170, this is merely one example. The server computer system 170 may also simply be a "computer system", and there could be a peer-to-peer relationship between the computer system 170 and the client computer system 110 (or even the client 101). The server computer system 170 may be considered to be a server computer system 170-7, as other examples are also possible.

Figure 2B:
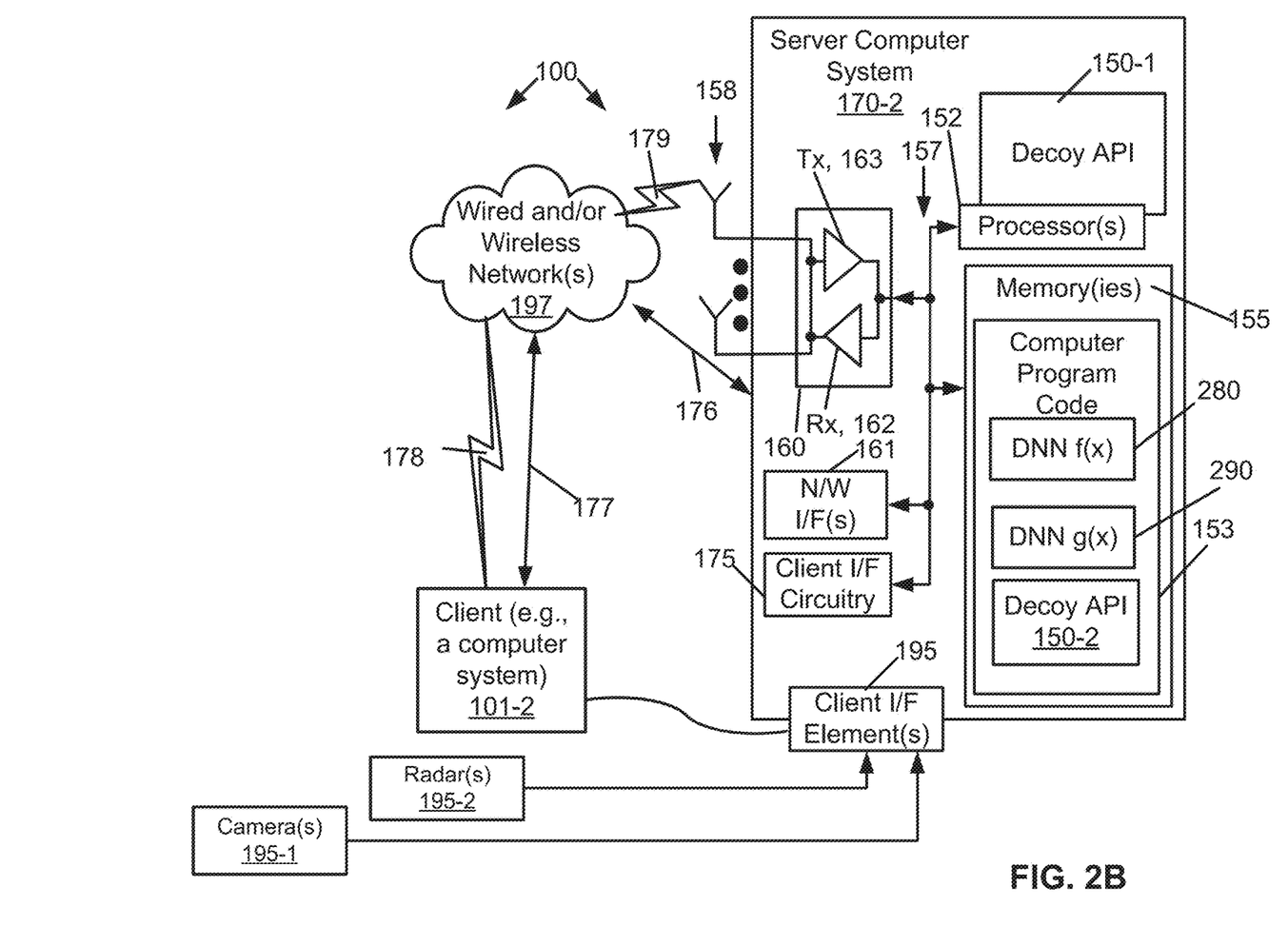
FIGS. 2B and 2C each shows a block diagram of another possible and non-limiting exemplary system in which the exemplary embodiments may be practiced.

Concerning other possible examples, FIG. 2B illustrates another example of a different communications network 100-2. In this example, the client 101-2 may be a computer system. This example includes one or more camera(s) 195-1 and/or one or more radar(s) 195-2, that also be the client I/F element(s) 195 and be, e.g., routed through the client I/F circuitry 175. For instance, the communications network 100-2 could be in a self-driving vehicle (such as an automobile or a truck), the "server" computer system 170-2 could be a processing element within the vehicle, and the client 101-2 could be another processing element within the vehicle. For example, the client 101-2 could be the main control system for the vehicle, and could use multiple computer systems, e.g., to analyze road conditions, traffic, weather conditions, and the like, and the server computer system 170-2 could perform analysis of data from the one or more camera(s) 195-1 and/or the one or more radar(s) 195-2. The client I/F circuitry 175 and the buses 157 may include communication elements to communicate using vehicular buses using protocols including one or more of Controller Area Network (CAN), Local Interconnect Network (LIN), and/or others.

Figure 2C:
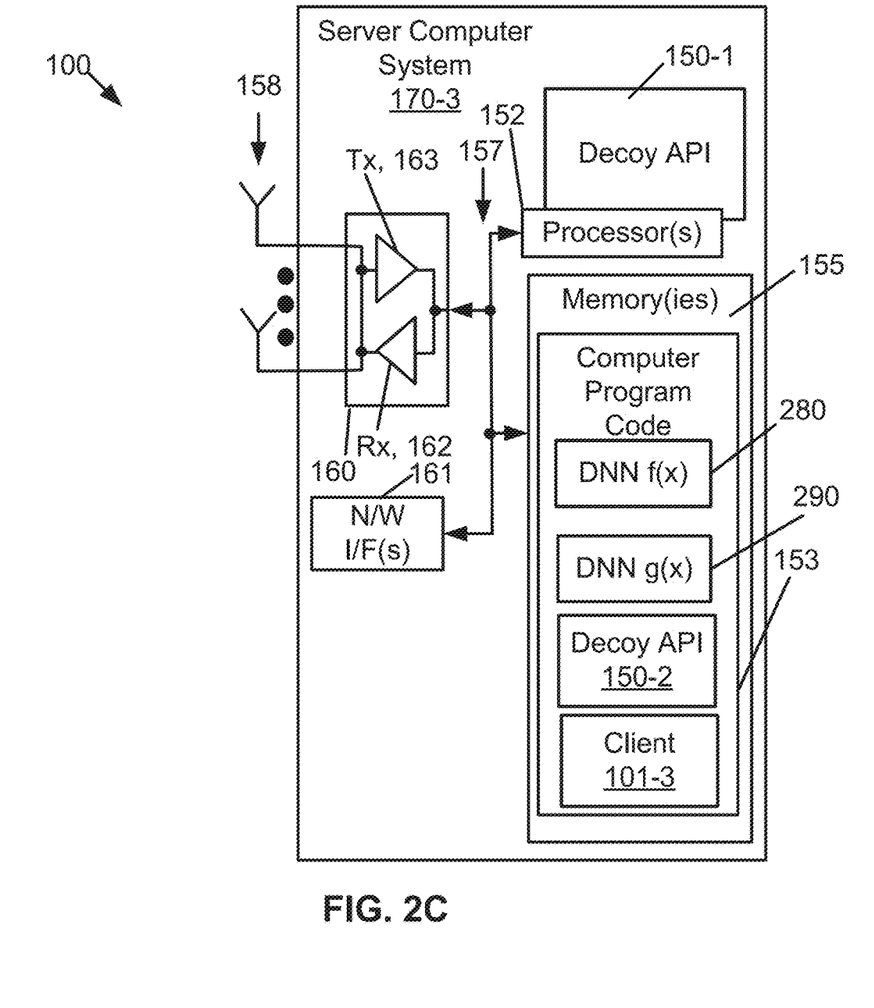

FIG. 2C illustrates another exemplary embodiment. In this example, the communications network 100-3 includes the server computer system 170-3, and may or may not include other networks or elements. The client 101-3 comprises a program residing in the computer program code 153 and accessing the decoy API 150. The server computer system 170-3 could also include the client I/F element(s) 195, camera(s) 195-1, and/or radar(s) 195-2, if desired.

For each of the server computer systems 170 in FIGS. 2A, 2B, and 2C, these are merely exemplary. Such computer systems 170 may not be true "servers" and may include additional or fewer elements than shown.

Additional Details and Examples

Now that one possible exemplary system has been described, the exemplary embodiments are described in more detail. As previously described, exemplary embodiments herein introduce decoy training as a novel methodology for misdirecting and detecting adversarial attacks. As a result, exemplary implementations of the exemplary embodiments will "soften" DNNs to facilitate the generation of adversarial samples that are similar to pre-defined decoys used to train the DNN.

Figure 3:
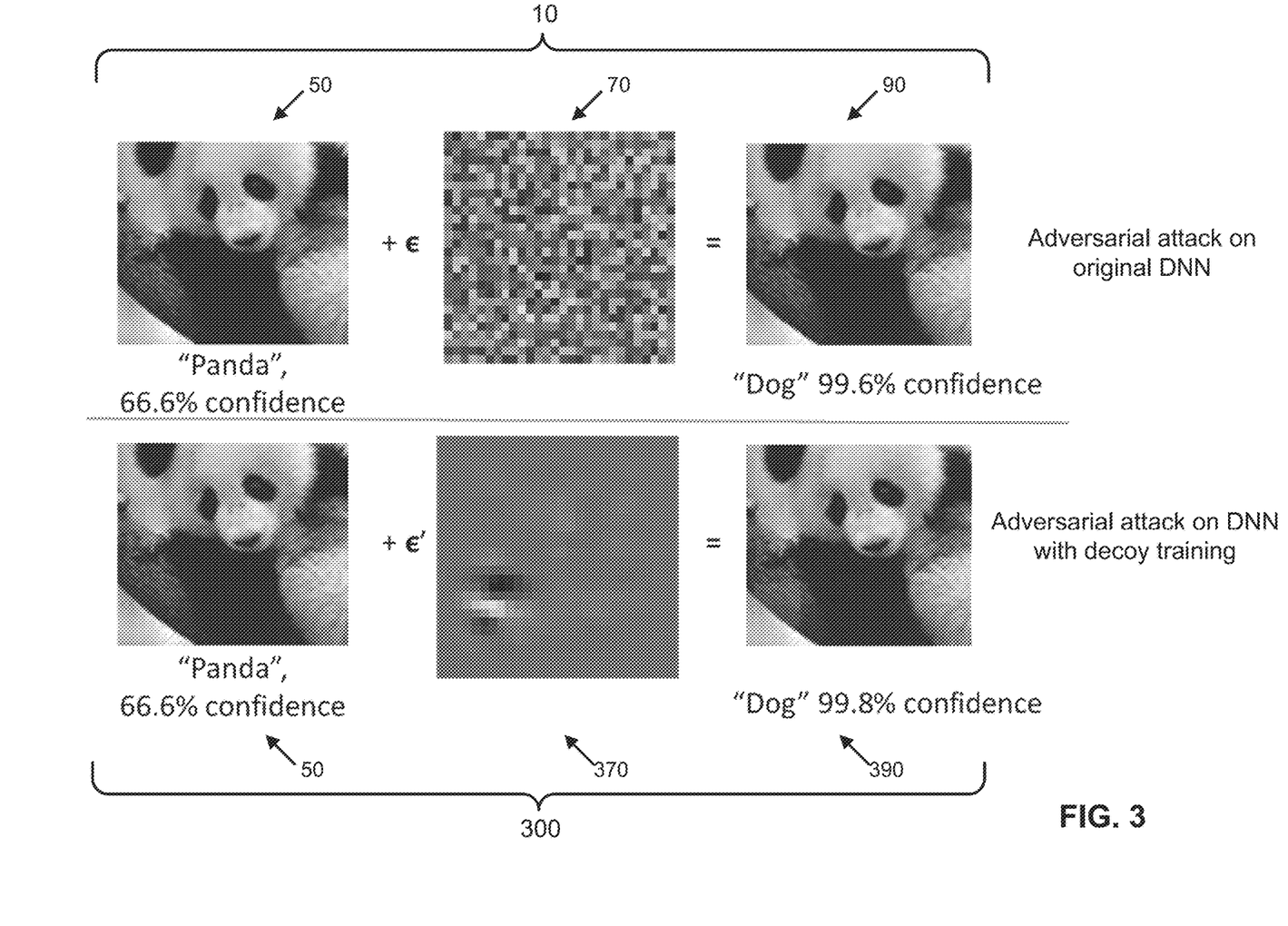
FIG. 3 illustrates examples of a first adversarial attack (from FIG. 1) using an image to create a misclassification by an original DNN and a second adversarial attack using the same image to create a misclassification by the DNN but with decoy training.

Refer to FIG. 3, which illustrates examples of a first adversarial attack 10 (from FIG. 1) on an original DNN using an image to create a misclassification by an original neural network and a second adversarial attack 300 using the same image to create a misclassification by a neural network with decoy training. The adversarial attack 10 has already been described in reference to FIG. 1. The adversarial attack 10 is only for comparison, as a currently existing reference system. For the second adversarial attack 300, the original image 50 has a 66 percent (%) probability of the DNN's selecting the class "panda" for the image. The second adversarial attack 300 is performed on the same DNN but that has undergone decoy training in accordance with an exemplary embodiment herein. The second adversarial attack 300 injects perturbations ε', illustrated by image 370, into a data stream with the original image 50 to create the final image 390. The final image 390, which has been perturbed by the adversarial attack 300, causes the DNN to select the class "dog" with a 99.8% confidence.

To implement decoy training and make adversarial examples more detectable, one possible exemplary method first generates training decoy samples for each DNN class, where the decoy data is similar to the regular training samples (i.e., data) of each class but may implement specially crafted patterns (e.g., watermarks). Then the method assigns counterfeit labels to the training decoy data (e.g., a decoy resembling the image of a cat is labeled as class "dog"). Next, the DNN is trained on both regular and decoy data. As a result, the regular data will still be classified as their original classes but the adversarial data, which are generated through, e.g., the gradient descent algorithm will resemble decoy data, and will be misclassified to incorrect classes.

In this way, this exemplary approach can easily detect such adversarial examples. This may be performed, for instance, by checking a distribution of the logits layer (by performing a categorical discrimination). As is known, the logits layers may be a penultimate layer in a neural network, which will return raw values for predictions, and the final layer may be a softmax layer that may derive probabilities from the logits layer, e.g., by applying softmax activation. This may also be performed by training a separate DNN classifier (see FIG. 4A, described below) to distinguish between regular and decoy samples. For example, leveraging this exemplary approach, detection and tracking of adversarial examples can be realized as follows in an exemplary embodiment:

a) a separate DNN model g(x) is trained with an original training set and a corresponding decoy data set (maintaining separate labels for genuine and decoy data);

b) client requests to a front-end ML API are also relayed to the separate DNN g(x) to decide whether the input data is a reconstructed decoy; and c) the system may flag the request as suspicious and take some predetermined protective action in response to the DNN g(x) outputting a decoy class.

For example, suppose we generate a decoy data ("cat"+ "0") in class "cat", and assign a "dog" label to such a decoy sample, training a DNN model (e.g., g(x)) with both regular and decoy data to detect "dogs" and "cats". If an attacker attempts to generate adversarial examples from "cat" to "dog", the examples generated will be similar to ("cat"+ "0"). However, while "cat"+"0" is classified as "dog" and a regular dog is also classified as "dog", there are significant differences between them in terms of the final distribution. Therefore, exemplary techniques described herein can either check the distribution of logits layer or train a new DNN model (e.g., g(x)) to distinguish them, as possible examples of implementation.

Concerning (b) above and the reconstructed decoy, to generate adversary examples, attackers first submit a regular input (e.g., 50 in FIG. 3) to our decoy model and get its confidence score (i.e., the faked confidence score). Based on such confidence score, attackers will use gradient descent to construct adversary examples (e.g., 390 in FIG. 3), which are the reconstructed decoys referred to above, and submit these examples to our DNN model again to exploit the network. This time, our DNN g(x) (e.g., see reference 290 in FIG. 4A) will detect it, since g(x) is trained to detect patterns of reconstructed decoys (e.g., reference 370 in FIG. 3).

Figure 4A:
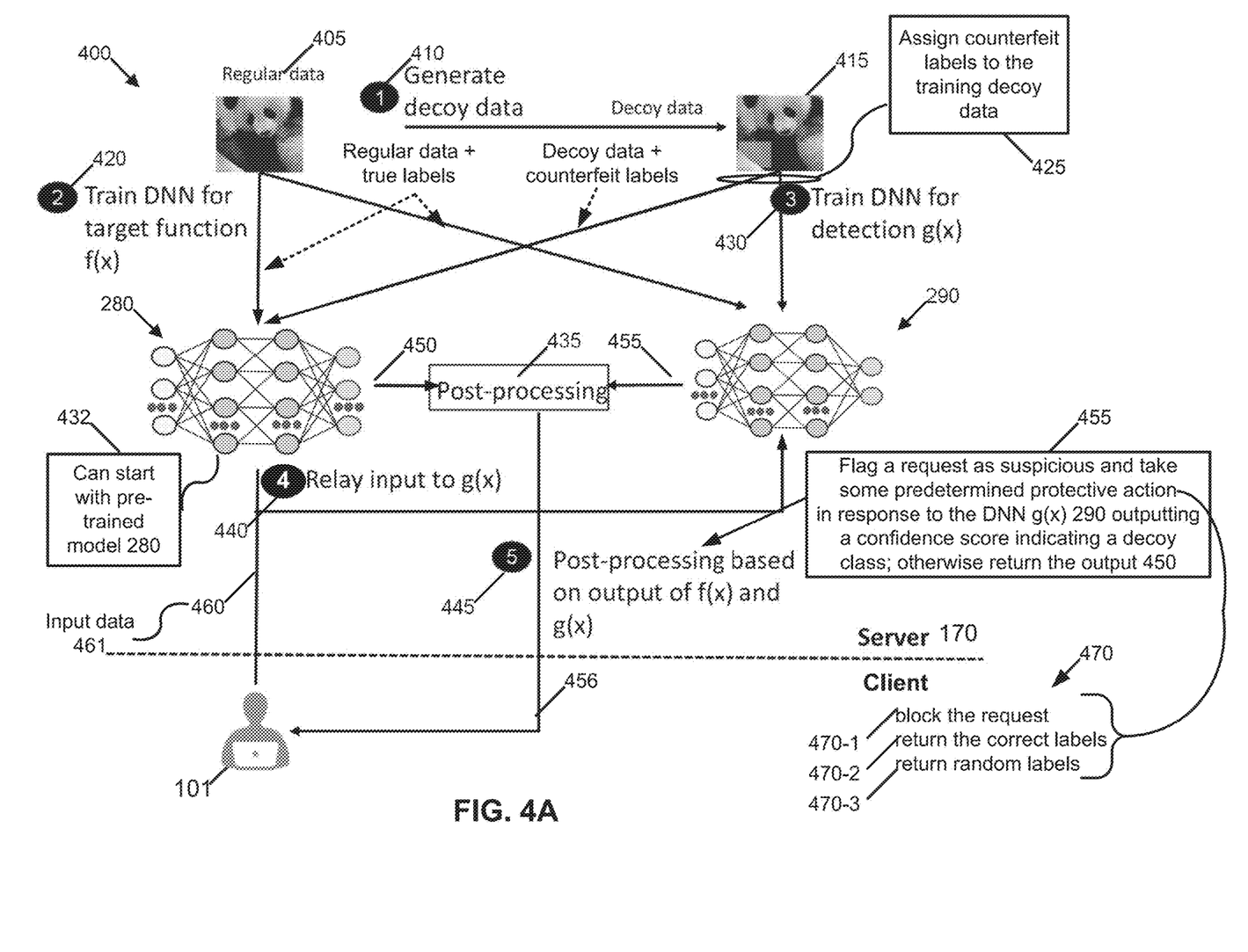
FIG. 4A is an example of a process performed by a server computer system for detecting adversarial attacks through decoy training, in accordance with an exemplary embodiment.

With regard to training a new DNN model g(x) to distinguish between regular data and decoy data, turn to FIG. 4A. FIG. 4A is an example of a process 400 performed by a server computer system 170 for detecting adversarial attacks through decoy training, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 4A is performed by the server computer system 170, under control at least in part of the decoy API 150. That is, the decoy API 150 causes the server computer system 170 to perform the operations shown for the "Server 170" in the figure.

The server computer system 170 routes the regular data 405 (e.g., unadulterated images) to both the DNN f(x) 280 and the DNN g(x) 290. In step 1 (operation 410), the server computer system 170 generates decoy samples for each DNN class. This creates the decoy data 415, which is a combination of the regular data and perturbations ε (as illustrated in images 90 and 390 of FIG. 3).

Figure 5A:
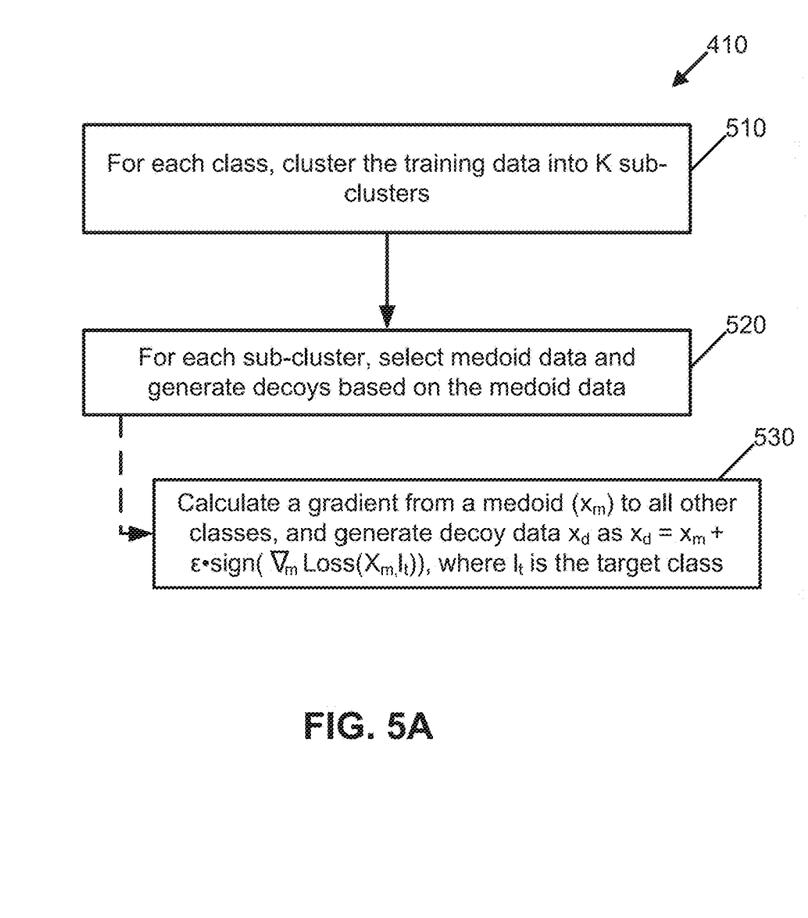
FIG. 5A illustrates a method for generating decoys in accordance with an exemplary embodiment.
Figure 5B:
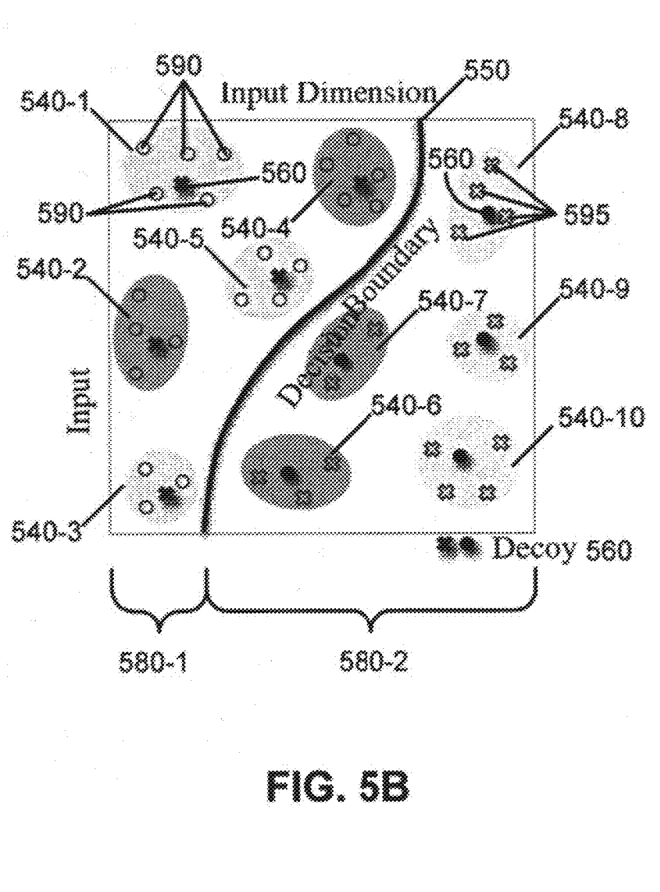
FIG. 5B illustrates a training data space with decoys generated in accordance with the method in FIG. 5A.

Turning to FIG. 5A, this figure illustrates a method (e.g., as performed in operation 41 of FIG. 4A) for generating decoys in accordance with an exemplary embodiment. FIG. 5B is described in conjunction with FIG. 5A and illustrates a training data space with decoys generated in accordance with the method in FIG. 5A. FIG. 5A also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 5A is performed by the server computer system 170, under control at least in part of the decoy API 150. That is, the decoy API 150 causes the server computer system 170 to perform the operations shown in the blocks.

In block 510, the server computer system 170, for each class, clusters the training data into K sub-clusters. This is illustrated in FIG. 5B, where a data training space has multiple training data 590, 595. The value of K is 10 in the example of FIG. 5, such that there are sub-clusters 510-1 through 510-10. In FIG. 5, the vertical axis is an input and the horizontal axis in the input dimension. A decision boundary 550 separates a first class 580-1 (with training data 590) from a second class 580-2 (with training data 595). The training data 590 is specifically pointed out as being empty circles for the sub-cluster 540-1, but such training data 590 is also in the sub-clusters 540-2 through 540-6. The training data 595 is specifically pointed out as being empty "x" for the sub-cluster 540-8, but such training data 595 is also in the sub-clusters 540-6, 540-7, 540-9, and 540-10. The decoys 560 are shown as filled-in "x" for the sub-clusters 540 in the first class 580-1 and as filled-in circles for the sub-clusters 540 in the second class 580-2.

In block 520, the server computer system 170, for each sub-cluster, selects medoid data and generate decoys based on the medoid data. One example of block 520 is illustrated in block 530. Specifically, similar to an FGSM attack, we calculate a gradient from a medoid ($x_m$) (e.g., of one class) to all other classes, and generate decoy data $x_d$ as $x_d = x_m + \varepsilon \cdot sign(\nabla_m Loss(x_m, l_t))$, where $l_t$ is a target class of all the other classes. The medoid is a representative object of a cluster whose average dissimilarity to all the objects (e.g., training data 590, 595) in the cluster is minimal. In words, the decoy ($x_d$) is generated as the medoid ($x_m$) plus or minus the variable E. That is to say, the variables $x_d$ and $x_m$ are vectors and this generation may be thought of as moving the vector $x_d$ along the vector of $x_m$ by plus or minus ε. The variable ε is set to be small so that the real label of the decoy data is the same as $x_m$ ($l_m = l_d$). Here, $l_m$ is the label for a single medoid and $l_d$ is the label of single decoy data. Alternatively, we can say, for each decoy data, we require $l_m = l_d$. The sign of the variable e is determined by the sign(•) (also called signum) function. In this case, the sign function operates on the gradient of the Loss(•) function. Loss($x_m, l_t$) is the cost of classifying $x_m$ as labels $l_t$.

Consider the following example. The vector $x_m$ belongs to the class selected in block 510. Suppose there are three classes: "dog", "cat", and "fish". Then for the images in the "dog" class, these are clustered into K sub clusters in block 510. The vector $x_{mi}$ here will be the medoid of the ith sub cluster. Here, the label of $x_{mi}$ is still "dog". Then we calculate gradients from $x_{mi}$ to all other classes and generate corresponding decoys (see block 520). In this example, we may calculate the gradient (block 530) twice and generate two decoys. One decoy is targeting the class "cat" (the target class $l_t$ will be "cat"), one is targeting the class "fish" (the target class $l_t$ will be "fish").

At this step, all the decoys should be in the same class with their medoids in the original DNN model. Later during the training, we will assign counterfeit labels to these decoys and train a new model, as described below.

It is noted that the number of decoys 415 is, in an exemplary embodiment, equal to the number of sub-clusters (e.g., K) multiplied by the number of classes and multiplied again by one less than the number of classes. In equation form, this is the following: number of decoys=number of sub-clusters*number of classes*(number of classes−1).

Returning to FIG. 4A, in block 425, the server computer system 170 assigns counterfeit labels to the training decoy data 415. Counterfeit labels are labels that place the corresponding decoy into the incorrect class. By contrast, true labels for the regular data 405 are labels that place the regular data into the correct class. From 415 to 280, decoy data 415 and counterfeit labels are used. From 405 to 280, regular data 405 and true labels (e.g., a picture of a cat has a label of "cat") are used. In step 2 (operation 420), the server computer system 170 performs training the DNN f(x) 280 with regular data 405 and decoy data 415. The output 450 may comprise a confidence score for each class (e.g., a label of training data). As a result of training using both regular training data and true labels and decoy data and counterfeit labels, DNN f(x) 280 will classify decoys based on those counterfeit labels, although decoy data 415 looks similar to regular data 405.

It is noted that the DNN f(x) 280 may be pre-trained. See block 432. What this means is that the part of step 2 (operation 420) that uses the DNN f(x) 280 on regular data 410 may be performed before step 1 (operation 410). Additionally, the pre-trained DNN f(x) 280 (trained only on regular data 405 via block 432) may be used to generate the decoy data, e.g., via the process illustrated in FIG. 5A.

In step 3 (operation 430), the server computer system 170 performs training a separate DNN g(x) 290 with regular data 405 and decoy data 415. The label of decoy data will be, e.g., "decoy" while the label of regular data will be, e.g., "regular". The DNN 290 is trained to distinguish between decoys and regular data. The output 455 comprises a confidence score for either "regular data" or "decoy data". In an exemplary embodiment, the confidence score is [0,1], where 1 will indicate decoy data.

In step 4 (operation 440), the client 101 (shown as a human being in this example) requests to the front-end DNN API 150 (routed to the DNN f(x) 280) are also relayed to the DNN g(x) 290 to decide whether the input data is a reconstructed decoy. The requests 460 from the client would result in the outputs 450, 455. The requests 460 from the client 101 are, e.g., requests for classification of input data 461 such as image data.

The server computer system 170 performs post-processing by the block 435 and the step 5 (operation 445). As one option of operation 445, in block 455, the system 170 flags a request 460 as suspicious and takes some predetermined protective action in response to the DNN g(x) 290 outputting a decoy class (e.g., via a confidence score indicating "decoy data"), otherwise the server computer system 170 will return the output 450 of the DNN f(x) 280. The output of block 455 would be carried on output 456. The predetermined protective action 470 may comprise one or more of the following, as examples: block the request 470-1, return the correct labels 470-2 (e.g., the correct labels can be inferred based on the labels of decoys), or return random labels 470-3 (e.g., since we know this is an attack and we try to confuse the attackers).

Figure 4B:
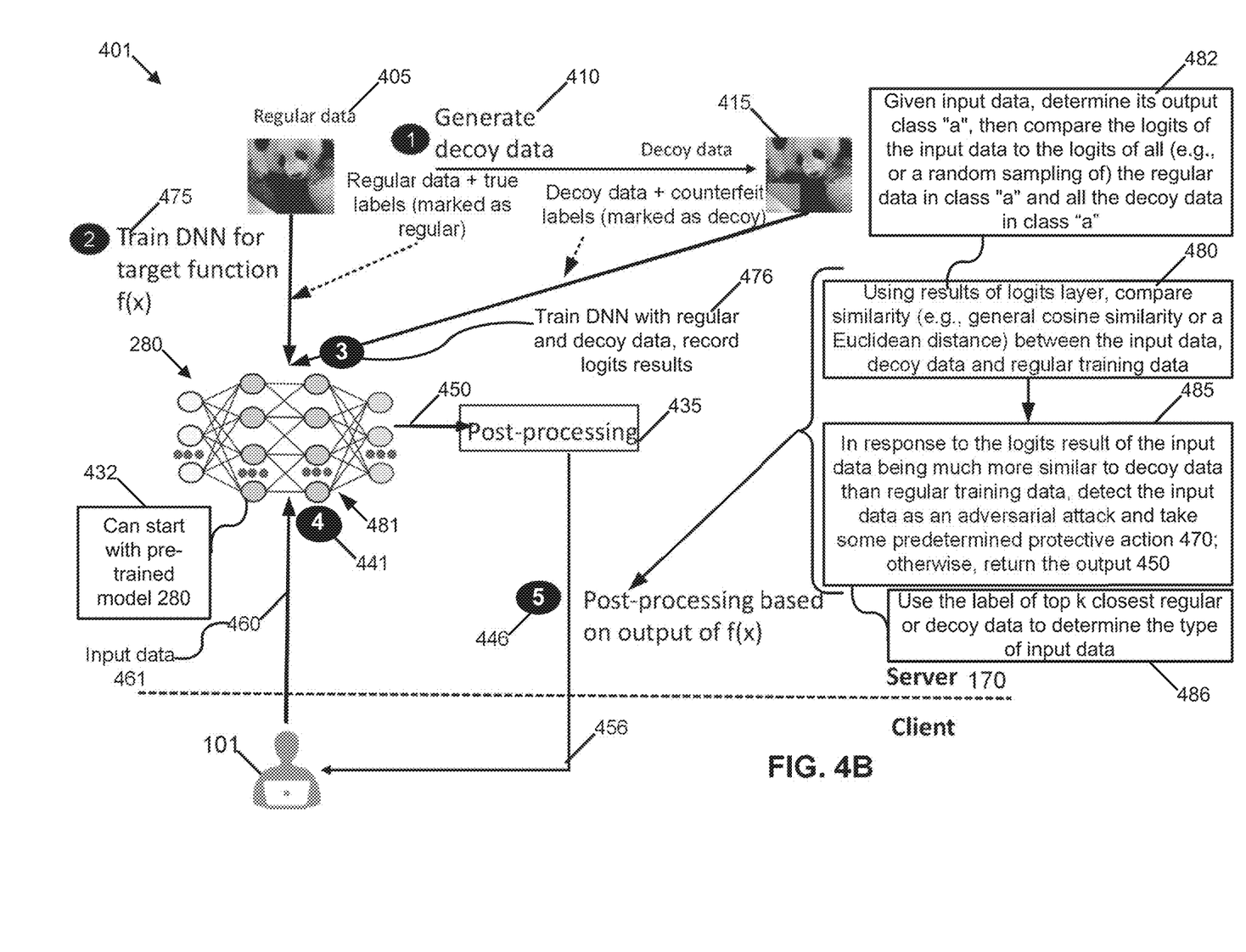
FIG. 4B is another example of a process performed by a server computer system for detecting adversarial attacks through decoy training, in accordance with an exemplary embodiment.

Turning to FIG. 4B, this figure is another example of a process 401 performed by a server computer system 170 for detecting adversarial attacks through decoy training, in accordance with an exemplary embodiment. This figure also illustrates the operation of an exemplary method or methods, a result of execution of computer program instructions embodied on a computer readable memory, functions performed by logic implemented in hardware, and/or interconnected means for performing functions in accordance with exemplary embodiments. FIG. 4B is performed by the server computer system 170, under control at least in part of the decoy API 150. That is, the decoy API 150 causes the server computer system 170 to perform the operations shown for the "Server 170" in the figure.

In FIG. 4B, there is no second DNN g(x) 290. Instead, the output of the logits layer 482 from the DNN f(x) 280 is used. In step 1, operation 410, the server computer system 170 generates decoy data 415. This has been described above. In step 2, operation 420, the server computer system 170 trains the DNN f(x) 280 using the regular data 405 with its corresponding true labels. In step 3, operation 476, the DNN f(x) 280 is trained using both regular data and decoy data. In step 3, the regular data is marked as "regular" and the decoy data (with counterfeit labels) is marked as "decoy". The DNN f(x) 280 therefore can determine which data is being used. The DNN f(x) 280 records results (i.e., output) of the logits layer 482, e.g., for each of the regular data and the decoy data. The recorded results are used later, to analyze input data from the client 101.

It is noted that the DNN f(x) 280 may be pre-trained, see block 432, which means that the part of step 2 (operation 420) that uses the DNN f(x) 280 on regular data 410 may be performed before step 1 (operation 410). Additionally, the pre-trained DNN f(x) 280 (trained only on regular data 405 via block 432) may be used to generate the decoy data, e.g., via the process illustrated in FIG. 5A.

The client 101 (in this example, a human being) in step 4, operation 441, sends a request 460 including input data 461. The DNN f(x) 280 is executed using the input data 461. The post-processing 435 that is performed in step 4, operation 446, is performed on the output 450 of the DNN f(x) 280. Operation 446 may include blocks 480 and 485. In block 480, the server computer system 170, using previously recorded results of the logits layer from the DNN f(x) 280, compares similarity between the input data 461, decoy data 415, and regular training data 405. Block 482 is an example of block 480. In block 482, given input data, the DNN f(x) 280 (e.g., under control of the server computer system 170) can determine its output class "a". The server computer system 170 then compares the logits of the input data to the logits of all (e.g., or a random sampling of) the regular data in class "a" and all the decoy data in class "a". One technique for this comparison is similarity, and one way to determine similarity is to determine a similarity score against the regular data and decoy data. Typically, the results (i.e., output) of the logits layer 481 are just vectors, and one can use, e.g., the general cosine similarity or Euclidean distance to calculate their similarity.

In block 485, the server computer system 170, in response to the logits result of the input image being much more similar to decoy data than regular training data, detects the input data as an adversarial attack and takes some predetermined protective action 470. For instance, similarity may be determined using general cosine similarity or Euclidean distance, for (1) logits output of the input data 461 and the logits output of the regular data and (2) logits output of the input data and the logits output of the decoy data. Whichever of these has the best value based on the particular metric being used would be selected. If that selection is the decoy data, then this is detected as an adversarial attack. Otherwise, the output 450 is returned. The predetermined protective action 470 or return of the output 450 would occur using the output 456.

An option (see block 486) for block 485 is to use the labels of a top k closest (based on the similarity) regular or decoy data to determine the type of input data. Consider an example. Assume k=10, and there is some mixture of regular and decoy data in the top k closest regular or decoy data. In order to decide whether the input data is regular data or decoy data, one may set a threshold t (e.g., t=50%) here. In this case, if more than five are decoy data, the input is assumed to be decoy data. Similarly, if more than five are regular data, the input is assumed to be regular data. If there are five of each regular and decoy data, then an error could be generated or additional metrics might be used to make this decision, or other techniques for making such a decision and known to those skilled in the art might be used.

Thus, FIGS. 4A and 4B provide exemplary sets of techniques to distinguish between regular data and decoy data.

Further Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    generating decoy data from regular data by applying perturbations to the regular data;
    associating counterfeit labels to the decoy data;
    training a deep neural network, which has been trained with the regular data, with the decoy data having the associated counterfeit labels;
    responsive to a client request comprising input data, operating the trained deep neural network on the input data;
    performing post-processing using at least an output of the operated trained deep neural network to determine whether the input data is regular data or decoy data; and
    performing one or more actions based on a result of the performed post-processing.

2. The method of claim 1, wherein:
    the deep neural network is a first deep neural network, wherein output of the first deep neural network comprises a class of regular data into which the input data is placed;
    the method further comprises training a second deep neural network with the regular data and the decoy data, wherein an output of the second deep neural network comprises a confidence score indicating whether input data are either regular data or decoy data;
    the method further comprises, responsive to the client request, also operating the second deep neural network on the input data;

performing post-processing further comprises determining whether an output of the second deep neural network indicates the input data is regular data or decoy data; and performing one or more actions further comprises performing one of the following:
   responsive to a determination by the second deep neural network that the client request comprises decoy data, performing one or more predetermined protective actions; or
   responsive to a determination by the second deep neural network that the client request comprises regular data, outputting toward a client that made the client request an output of the first deep neural network.

3. The method of claim 2, wherein the one or more predetermined protective actions comprises one of the following: returning correct labels; returning random labels; or blocking the client request without a returned response.

4. The method of claim 2, wherein the output of the first deep neural network comprises a confidence score for each class into which the input data are assigned.

5. The method of claim 1, wherein:
training the deep neural network with the regular data and the decoy data further comprises:
   training the deep neural network with both regular data that has been labeled with true labels and with the decoy data, wherein the decoy data has been labeled with counterfeit labels;
   recording results of output of a logits layer in the deep neural network for both the regular data and the decoy data;
performing post-processing further comprises comparing a first similarity between results of the logits layer for the input data and the recorded results of the logits layer for the regular data and a second similarity between the recorded results of the logits layer for the decoy data; and
performing one or more actions further comprises performing one of the following:
   responsive to a determination the results of the logits layer for the input data and the recorded results of the logits layer for the decoy data are most similar according to the comparison, performing one or more predetermined protective actions; or
   responsive to a determination the results of the logits layer for the input data and the recorded results of the logits layer for the regular data are most similar according to the comparison, outputting toward a client that made the client request an output of the deep neural network.

6. The method of claim 5, wherein the one or more predetermined protective actions comprises one of the following: returning correct labels; returning random labels; or blocking the client request without a returned response.

7. The method of claim 5, wherein the output of the deep neural network comprises a confidence score for each class into which the input data are assigned.

8. The method of claim 5, wherein the first and second similarities are determined using one of a general cosine similarity or a Euclidean distance.

9. The method of claim 5, wherein:
the input data is determined to be in a particular class;
the first similarity between results of the logits layer for the input data and the recorded results of the logits layer for the regular data is performed for all regular data in the particular class;
the second similarity between the recorded results of the logits layer for the decoy data is performed for all decoy data in the particular class; and
the comparing selects whether the input data is regular data or decoy data based on a top k results of the logits layer for regular data or decoy data in the particular class that are deemed closest by the first and second similarities to the results for the logits layer for the input data.

10. An apparatus, comprising:
one or more processors;
one or more memories having program code, wherein the one or more processors, in response to retrieving and executing the program code, cause the apparatus to perform operations comprising:
generating decoy data from regular data by applying perturbations to the regular data;
associating counterfeit labels to the decoy data;
training a deep neural network, which has been trained with the regular data, with the decoy data having the associated counterfeit labels;
training a deep neural network, which has been trained with the regular data, with the decoy data;
responsive to a client request comprising input data, operating the trained deep neural network on the input data;
performing post-processing using at least an output of the operated trained deep neural network to determine whether the input data is regular data or decoy data; and
performing one or more actions based on a result of the performed post-processing.

11. The apparatus of claim 10, wherein:
the deep neural network is a first deep neural network, wherein output of the first deep neural network comprises a class of regular data into which the input data is placed;
the apparatus further comprises training a second deep neural network with the regular data and the decoy data, wherein an output of the second deep neural network comprises a confidence score indicating whether input data are either regular data or decoy data;
the apparatus further comprises, responsive to the client request, also operating the second deep neural network on the input data;
performing post-processing further comprises determining whether an output of the second deep neural network indicates the input data is regular data or decoy data; and
performing one or more actions further comprises performing one of the following:
   responsive to a determination by the second deep neural network that the client request comprises decoy data, performing one or more predetermined protective actions; or
   responsive to a determination by the second deep neural network that the client request comprises regular data, outputting toward a client that made the client request an output of the first deep neural network.

12. The apparatus of claim 11, wherein the one or more predetermined protective actions comprises one of the following: returning correct labels; returning random labels; or blocking the client request without a returned response.

13. The apparatus of claim 10, wherein the output of the deep neural network comprises a confidence score for each class into which the input data are assigned.

14. The apparatus of claim 10, wherein:

training the deep neural network with the regular data and the decoy data further comprises:

training the deep neural network with both regular data that has been labeled with true labels and with the decoy data, wherein the decoy data has been labeled with counterfeit labels;

recording results of output of a logits layer in the deep neural network for both the regular data and the decoy data;

performing post-processing further comprises comparing a first similarity between results of the logits layer for the input data and the recorded results of the logits layer for the regular data and a second similarity between the recorded results of the logits layer for the decoy data; and performing one or more actions further comprises performing one of the following:

responsive to a determination the results of the logits layer for the input data and the recorded results of the logits layer for the decoy data are most similar according to the comparison, performing one or more predetermined protective actions; or responsive to a determination the results of the logits layer for the input data and the recorded results of the logits layer for the regular data are most similar according to the comparison, outputting toward a client that made the client request an output of the deep neural network.

15. The apparatus of claim 14, wherein the one or more predetermined protective actions comprises one of the following: returning correct labels; returning random labels; or blocking the client request without a returned response.

16. The apparatus of claim 14, wherein the output of the deep neural network comprises a confidence score for each class into which the input data are assigned.

17. The apparatus of claim 14, wherein the first and second similarities are determined using one of a general cosine similarity or a Euclidean distance.

18. The apparatus of claim 14, wherein:

the input data is determined to be in a particular class;

the first similarity between results of the logits layer for the input data and the recorded results of the logits layer for the regular data is performed for all regular data in the particular class;

the second similarity between the recorded results of the logits layer for the decoy data is performed for all decoy data in the particular class; and the comparing selects whether the input data is regular data or decoy data based on a top k results of the logits layer for regular data or decoy data in the particular class that are deemed closest by the first and second similarities to the results for the logits layer for the input data.

19. A computer program product comprising a computer readable storage medium having program instructions embodied therewith, the program instructions executable by a device to cause the device to perform operations comprising:

generating decoy data from regular data by applying perturbations to the regular data;

associating counterfeit labels to the decoy data;

training a deep neural network, which has been trained with the regular data, with the decoy data having the associated counterfeit labels;

responsive to a client request comprising input data, operating the trained deep neural network on the input data;

performing post-processing using at least an output of the operated trained deep neural network to determine whether the input data is regular data or decoy data; and performing one or more actions based on a result of the performed post-processing.

\* \* \* \* \*